3,591,532
HIGH DENSITY CELLULAR POLYURETHANE ELASTOMER
Lawrence W. Abercrombie and Nabil N. Saaty, Hamden, and Adnan A. R. Sayigh, North Haven, Conn., assignors to The Upjohn Company, Kalamazoo, Mich.
No Drawing. Continuation-in-part of application Ser. No. 604,625, Dec. 27, 1966. This application June 6, 1968, Ser. No. 734,869
Int. Cl. C08g 22/46
U.S. Cl. 260—2.5AN
14 Claims

ABSTRACT OF THE DISCLOSURE

Cellular polyurethane elastomers of high density (illustratively from 10 to 50 p.c.f.) are prepared from (1) methylenebis (phenyl isocyanate) or modified forms thereof, including mixtures of polymethylene polyphenyl isocyanates containing methylenebis (phenyl isocyanate), and (2) a polyester diol, a polyalkadiene polyol having a functionality of at least two or a polyether polyol (functionality 2 to 4) and, optionally, (3) a curative, using conventional high density foam procedures. The novel compositions can be used for a variety of purposes including shoe soles, gaskets, shock and sound absorbent applications, and the like.

CROSS REFERENCE TO RELATED APPLICATIONS

This application is a continuation-in-part of application Ser. No. 604,625 filed Dec. 27, 1966, now abandoned.

BACKGROUND OF THE INVENTION (1) Field of the invention

This invention relates to novel cellular polyurethane elastomers and to processes for their preparation, and is more particularly concerned with novel high density cellular polyurethane elastomers which are derived from methylenebis(phenyl isocyanate) and modified forms thereof including mixtures of polymethylene polyphenyl isocyanates containing methylenebis(phenyl isocyanate), and with methods for the preparation of said cellular elastomers.

(2) Description of the prior art

The general practice in preparing high density cellular polyurethanes has been to employ prepolymer systems, i.e. systems in which a portion of the active hydrogen component is first reacted with the polyisocyanate and said prepolymer is subsequently mixed with the surfactant, coloring agent, blowing agent and the remaining active hydrogen component (e.g. a crosslinking agent) to form the cellular elastomer. Typical such methods are those described in British Patent 1,037,907 and in the paper of R. P. Kane, "Closed-Cell Urethane Sponge," Rubber World, vol. 147 (35), February 1963.

A "one-shot" method, wherein all of the constituents are mixed simultaneously would have obvious advantages, especially in terms of reducing the number of manual operations and hence reducing labor costs over the two-step procedures described above.

This invention makes available, for the first time, high density polyurethane cellular elastomers prepared by a one-shot process. The systems used to prepare said elastomeric products are characterized by excellent flow properties for molding purposes and fast curing rates in the absence of externally applied heat.

SUMMARY OF THE INVENTION

The novel compositions of the invention are inclusive of high density cellular polyurethane elastomers which comprise the product of the reaction, under foam producing conditions, of (a) a polyisocyanate selected from the class consisting of (i) methylenebis(phenyl isocyanate) and (ii) mixtures of polymethylene polyphenyl isocyanates containing from about 35 percent by weight to about 85 percent by weight of methylenebis(phenyl isocyanate);
(b) a polyol selected from the group consisting of (i) polyester diols having an equivalent weight from about 75 to about 1700, (ii) polyether polyols having an equivalent weight from about 300 to about 1600 and an average functionality from about 2.0 to about 4.0, and (iii) polyalkadiene polyols having an equivalent weight of from about 300 to about 2000 and a functionality of at least 2, and (iv) mixtures of at least two of (i), (ii), and (iii).
(c) a blowing agent selected from the group consisting of water, aliphatic halogenated hydrocarbons having a boiling point not more than 110° C. and mixtures thereof;

wherein the ratio of isocyanate groups to active hydrogen atoms in said reaction components, including the water when the latter is employed as blowing agent, is within the range of about 0.95:1.0 to about 1.2:1.0.

DETAILED DESCRIPTION OF THE INVENTION

The novel compositions of the invention are characterized by high flex resistance, high resistance to permanent deformation, high abrasion resistance, low water absorption capacity, high tear strength and good heat resistance. Further, by using different combinations of the components of the reaction mixture, within the ranges set forth above, or by employing a curative as discussed hereinafter, it is possible to vary the physical properties, particularly hardness, of the resulting product in a highly useful manner. Thus, it is possible to obtain products which have varying degrees of hardness and like physical properties adapted for a wide variety of different uses. The manner in which this variation can be achieved will be discussed in detail below. The novel compositions of the invention can be used, depending upon the particular hardness and other properties achieved by appropriate variations of combinations of reaction components, in the fabrication of products such as shoe soles and heels, pour-in-place gaskets, door seals, pads for leaf springs (spring isolators), bumper guards, tire inserts, and like automotive uses, flexible molds, vibration pads, garment liner or insulators, and the like.

The term "high density" as used in this specification to qualify the cellular elastomers of the invention means a density in excess of about 10 pounds per cubic foot and up to about 50 pounds per cubic foot and even higher.

Preferred cellular elastomers prepared in accordance with this invention have a density from about 20 to about 40 pounds per cubic foot.

The polyisocyanate component of the high density cellular elastomers of the invention is selected from the class consisting of (i) methylenebis(phenyl isocyanate) and (ii) mixtures of polymethylene polyphenyl isocyanates containing from about 35 percent by weight to about 85 percent by weight of methylene-bis(phenyl isocyanate).

The polyisocyanate component (i) is inclusive of the pure 4,4'-isomer, i.e. 4,4'-methylenebis(phenyl isocyanate) as well as mixtures of the latter isomer with the corresponding 2,4'-isomer, which mixtures are available commercially and generally contain up to about 10% of the 2,4'-isomer, the remainder of the mixture being 4,4'-isomer. Said polyisocyanate component (i) is also inclusive of methylenebis(phenyl isocyanate), either 4,4'-isomer or mixtures of 4,4'-isomer and 2,4'-isomer, which has been treated to convert a minor proportion, generally less than 15% by weight of the starting material, to an artefact of said starting material. For example, the polyisocyanate component (i) can be methylenebis(phenyl isocyanate) which has been converted to a stable liquid at temperatures of about 15° C. and higher [methylenebis(phenyl isocyanate) is normally a solid at ambient temperature and has a melting point of the order of 35 to 42° C.] by heating at about 160° C. to about 250° C. in the preesnce of from about 0.1% to about 3% of a trialkyl phosphate such as triethyl phosphate. Said heating process can be carried out on a batch or continuous basis and the period for which the heating is carried out varies according to the reaction temperature employed. The conditions of heating time and reaction temperature required to convert any particular batch of methylenebis(phenyl isocyanate) to a stable liquid product can be determined readily by a process of trial and error. Generally speaking, such treatments are carried out under such conditions that the isocyanate equivalent has changed from an initial value of 125 corresponding to the methylenebis(phenyl isocyanate) originally present as starting material to a value in the range of 130 to 150. The processes employed in the preparation of the above materials are advantageously those described in Belgium Pat. 678,773.

Illustrative of other modified methylenebis(phenyl isocyanates) which are embraced by polyisocyanate component (i) above are the products obtained by treating methylenebis(phenyl isocyanate) [either pure 4,4'-isomer or mixtures of the latter with 2,4'-isomer] with a minor portion of a carbodiimide such as diphenylcarbodiimide in accordance, for example, with the procedure described in British Pat. 918,454. In accordance with said process a minor proportion of the methylenebis(phenyl isocyanate) is converted to the corresponding isocyanatocarbodiimide and there is obtained a mixture of a major proportion of unchanged starting material and a minor proportion of said isocyanato-substituted carbodiimide.

The polyisocyanate component (ii) which can be employed in the novel compositions of the invention is inclusive of mixtures of polymethylene polyphenyl isocyanates obtained by phosgenation of corresponding mixtures of the corresponding methylene-bridged polyphenyl polyamines. The latter, in turn, are obtained by interaction of formaldehyde, hydrochloric acid and primary aromatic amines, for example, aniline, o-chloroaniline, o-toluidine, and the like using procedures well-known in the art; see, for example, U.S. Pats. 2,683,730, 2,950,263 and 3,012,008; Canadian Pat. 700,026; and German specification 1,131,877. Said polymethylene polyphenyl isocyanates generally contain about 35 to about 85 percent by weight of methylenebis(phenyl isocyanates) the remainder of said mixture being polymethylene polyphenyl isocyanates of functionality higher than 2.0. The overall average functionality of any particular mixture is, of course, directly related to the proportions of the various polymethylene polyphenyl isocyanates in the mixture. The latter proportions correspond substantially to the proportions of methylene-bridged polyphenylamines in the intermediate mixture of polyamines which is phosgenated to obtain the isocyanate. The desired proportion of methylene-bridged polyphenylamines in said mixture is generally controlled by varying the ratio of aniline, or other aromatic amines, to formaldehyde in the initial condensation. For example, using a ratio of approximately 4 moles of aniline to 1.0 mole of formaldehyde there is obtained a mixture of polyamines containing approximately 85% by weight of methylenedianilines. Using a ratio of approximately 4 moles of aniline to about 2.6 moles of formaldehyde there is obtained a mixture of polyamines containing approximately 35 percent by weight of methylenedianilines. Mixtures of polyamines containing proportions of methylenedianiline intermediate between these limits can be obtained by appropriate adjustment of the ratio of aniline to formaldehyde.

The average functionality of polyisocyanates prepared from the above types of polyamine varies from a low of about 2.2 for polyisocyanates derived from polyamines containing approximately 85 percent by weight of methylenedianilines, through a value of 2.7 for polyisocyanates derived from polyamines containing approximately 50 percent by weight of methylenedianilines, to a high of about 3.0 for polyisocyanates derived from polyamines containing about 35 percent by weight of methylenedianilines.

As set forth above, the polyol component employed in preparing the compositions of the invention can be a polyester diol having an equivalent weight of about 75 to about 1700, a polyether polyol having an equivalent weight of about 300 to about 1600 with an average functionality of about 2.0 to about 4.0 or a polyalkadiene polyol having an equivalent weight of from about 300 to about 2000, or a mixture of two or more of the polyols within the above definitions.

Illustrative of the polyester diol polyols having an equivalent weight within the above range are those prepared by reacting an excess of a diol, preferably an aliphatic diol with from about 2 to about 10 carbon atoms in the aliphatic chain thereof, with a dicarboxylic acid which is preferably saturated and has no functional group containing active hydrogen atoms other than the carboxylic acid groups. Illustrative of the dicarboxylic acids which can be employed to prepare said polyester diols are oxalic, malonic, succinic, fumaric, adipic, pimelic and sebacic acids. In place of the free acids, the corresponding anhydrides can be used in the actual preparation of the polyesterdiols. Illustrative of the diols which can be used in the preparation of the polyester diols are ethylene glycol, propylene glycol, diethylene glycol, dipropylene glycol, 1,2-butanediol, 2,3-butanediol, 1,4-butanediol, 1,5-pentanediol, 1,6-hexanediol, 1,8-octanediol, and the like, as well as mixtures of two or more such diols. The polyester diols which are employed in the process of the invention also include those obtained by polymerizing ε-caprolactone in the presence of a diol such as those exemplified above, in accordance with procedures well-known in the art (see, for example, U.S. Pat. 2,914,556) to obtain the corresponding polycaprolactone diols. If desired, the polyester diols used in preparing the compositions of the invention can contain a minor amount, up to about 30 percent by weight, of a polyester polyol having a functionality higher than 2.0. Illustrative of such higher functional polyester polyols are those prepared from any of the dicarboxylic acids or corresponding anhydrides exemplified above and a polyhydric alcohol such as glycerol, trimethylolpropane, 1,2,6-hexanetriol, pentaerythritol, and the like.

The polyether polyols employed in the preparation of the compositions of the invention can be any of those having equivalent weight and functionality within the above stated ranges. Illustrative of such polyether polyols are the adducts of (i) alkylene oxides such as ethylene oxide, propylene oxide, 1,2-butylene oxide and the like, or mixtures of two or more such oxides, and (ii) polyhydric alcohols containing from 2 to 4 hydroxyl groups such as propylene glycol, ethylene glycol, dipropylene glycol, glycerol, trimethylolpropane, pentaerythritol, 1,2,6-hexanetriol and the like. Such polyether polyols and methods for their preparation are well-known in the art. If desired, a combination of two or more such polyether polyols can be employed as the polyether polyol component of the compositions of the invention. The preferred polyether polyols for use in the compositions of the invention are those wherein the majority of the hydroxyl groups, i.e. in excess of 75 percent, are primary.

The polyalkadiene polyols employed in the preparation of high density cellular polyurethane elastomers of the invention can be any of those having an equivalent weight within the above stated range. Such polyols are well-known in the art and are prepared by methods well-known in the art (see, for example, U.S. 3,338,861). Preferably the polyalkadiene polyols have a hydroxyl equivalent weight of about 1,000 to about 1,500. Examples of polyalkadiene polyols are the adducts of a hydroxyl-capping agent such as ethylene oxide, propylene oxide, butylene oxide, formaldehyde and the like and (a) a homopolymer of a conjugated alkadiene advantageously one containing from 4 to 8 carbon atoms such as butadiene and isoprene, or (b) a copolymer of said conjugated alkadiene and a vinyl monomer such as acrylonitrile, methacrylonitrile, styrene and the like. The polyalkadiene polyols sold under the trade name of Poly B–D resins are typical of such polyols.

When a combination of two or more of the above types of polyol is employed in the preparation of the compositions of the invention, said combination can comprise any proportion of polyester diol, polyether polyol and/or polyalkadiene polyol. It is preferred, however, to use a polyol component consisting either of one or more polyester diols free from polyether polyol and polyalkadiene polyol, or, most preferably, a polyol component consisting of one or more polyalkadiene polyols free from polyester diol and the polyether polyol.

The aliphatic halogenated hydrocarbons which are employed as blowing agents in the compositions of the invention are those having a boiling point below about 110° C. and preferably below about 50° C. and which are commonly employed in the art as blowing agents. Examples of such blowing agents are trichloromonofluoromethane, dichlorodifluoromethane chlorotrifluoromethane, 1,1-dichloro-1-fluoroethane, 1 - chloro - 1,1 - difluoro-2,2-dichloroethane and 1,1,1-trifluoro-2-chloro-2-fluorobutane or mixtures of two or more such compounds. While one or more of the above compounds can be used as the only blowing agent in preparing the compositions of the invention, it is preferred to use said agents in combination with water as blowing agents. In the most preferred form of the compositions of the invention, water alone is employed as blowing agent.

In preparing the high density cellular elastomers of the invention, the reaction of the polyisocyanate component $a$, the polyol component $b$, and the blowing agent $c$ is carried out in accordance with procedures well-known in the art using either the one-shot or prepolymer methods. In the prepolymer method, the polyisocyanate component is reacted with a portion of the polyol component. The isocyanate-terminated prepolymer so obtained is subsequently reacted with the polyol component in the presence of the blowing agent. Preferably, the high density cellular elastomers of the invention are prepared by the one-shot procedure in which the whole of the polyisocyanate and the polyol are brought together in the presence of the blowing agent, catalyst (as hereinafter discussed), and other adjuvants conventionally used in the preparation of polyurethanes of this type.

Advantageously, the overall ratio of isocyanate groups to active hydrogen atoms (as determined by the Zerewitinoff method, J. Am. Chem. Soc. 49, 3181, 1927) in the reaction mix employed to prepare the compositions of the invention lies within the range of about 0.95:1.0 to about 1.2:1.0. Preferably the overall ratio of isocyanate groups to active hydrogen atoms in the reaction mix is within the range of about 1.03 to about 1.08. It is to be noted that the active hydrogen atoms of the water employed as blowing agent in the compositions of the invention are taken into account in computing the overall NCO to active hydrogen ratios discussed above.

The reaction components, namely polyisocyanate, polyol, blowing agent, catalyst, and any other adjuvants employed, are brought together and mixed, using conventional procedures and apparatus such as mechanical blenders, mixing chambers and the like, and the foam mix is transferred to the appropriate mold or cavity to be filled. If desired, one or more components of the polyurethane reaction mix can be preheated before mixing takes place.

The amount of blowing agent employed, the degree of packing of the mold, the mold temperature and the temperature of the reactants all influence the final density of the desired cellular polyurethane. In order to produce foams of the desired high density, the amount of blowing agent employed is relatively small in weight compared with the other components of the reaction mix. Indeed the amount of blowing agent is so small that the moisture content of the polyol components becomes important and has to be taken into account in calculating the amount of blowing agent to be added to the reaction mixture. The calculation of the amount of blowing agent to be used in order to achieve any desired foam density in the subsequent cellular elastomer can be made in accordance with procedures well-known in the art. In the case of the use of water as the sole blowing agent, the total amount of water present in the reaction mix, including the original water content of the polyol components, is between about 0.02% by weight and about 1.50% by weight based on the polyol, in order to produce a resultant foam having a density within the range of about 10 to about 50 pounds per cubic foot.

The catalysts employed in the preparation of the cellular elastomers of the invention can be any of those conventionally employed in the art to catalyze the reaction of an isocyanate with an active-hydrogen containing compound; see, for example, Saunders et al., Polyurethanes, Chemistry and Technology, vol. I., pp. 227–232, Interscience Publishers, New York, 1964, and Britain et al., J. Applied Polymer Science 4, 207–211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium as well as phosphines and tertiary organic amines. The preferred catalysts for use in the process and compositions of the invention are the tertiary organic amines and mixtures thereof with organotin compounds such as dibutyl tin diluarate, stannous octoate, dibutyltin diacetate and the like. Examples of tertiary organic amine catalysts are triethylamine, triethylenediamine, N,N,N',N'-tetramethylethylenediamine, N,N,N',N'-tetraethylethylenediamine, N - methylmorpholine, N-ethylmorpholine, 1,1,3,3 - tetramethylguanidine, N,N,N',N'-tetramethyl-1,3 - butanediamine, N,N-dimethylethanolamine, N,N-diethylethanolamine, and the like.

The amount of catalyst employed in the process of the invention is generally of the order of about 0.10 to about 0.60 percent by weight based on the total weight of ingredients present in the foam mix, though amounts of catalyst outside this range can be used, if desired, for particular systems.

In a particular embodiment of the compositions of the invention, a curative, as hereinafter defined, is incorporated in the reaction mixture, and the compositions thereby obtained have a hardness of the order of 20

Shore A or higher, in addition to all the other outstanding properties set forth above for the compositions of the invention. Such compositions are particularly adapted for use as shoe soles, heels, and the like as well as for gasketry (either preformed or poured in place), and like mechanical seals, spring isolators, bumper guards, tire inserts, and like automotive uses, flexible molds, vibration pads, garment liners and the like.

This particular embodiment of the invention provides high density cellular polyurethane elastomers which comprise the product of reaction, under foam producing conditions, of the components $a$, $b$, and $c$, as defined above, together with a curative. In the case of those elastomers of the invention in which the polyol component is a polyester diol or a polyether polyol or a mixture thereof, the curative employed is one selected from the group consisting of (i) aromatic primary diamines wherein each of the amino groups is attached directly to an aromatic nucleus and wherein there is at least one group selected from the class consisting of halogen, lower-alkyl and lower-alkoxy in a position ortho to the amino groups in the aromatic nucleus and (ii) aliphatic hydrocarbon diols having from 2 to 6 carbon atoms, inclusive. In the case of those elastomers of the invention in which the polyol component is a polyalkadiene polyol, the curative is a N,N'-di(hydroxyalkyl) aniline which can be represented by the formula:

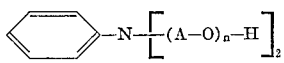

wherein $n$ has an average value of about 1 to 10 and A is a lower alkylene group of from 2 to 4 carbon atoms.

The term "lower-alkyl" means alkyl from 1 to 6 carbon atoms, inclusive, such as methyl, ethyl, propyl, butyl, pentyl, hexyl, and isomeric forms thereof. The term "lower-alkoxy" means alkoxy from 1 to 6 carbon atoms, inclusive, such as methoxy, ethoxy, propoxy, butoxy, pentyloxy, hexyloxy, and isomeric forms thereof. The term "lower-alkylene groups from 2 to 4 carbon atoms, inclusive" means ethylene, propylene and butylene and isomeric forms thereof.

Illustrative of the aromatic primary diamine curatives defined above are (a) those containing two benzene nuclei attached directly to each other and having one amino group attached to each nuclei, such as o-tolidine, 3,3'-dichlorobenzidine, 3,3'-dimethoxybenzidine and the like, and (b) diamines containing two benzene nuclei attached via a bridging group such as methylene, examples of which diamines are 2,2',5-trichloro-4,4'-methylenedianiline, 4,4'-methylenebis (3-chloroaniline) and the like. Illustrative of aliphatic hydrocarbon diols having from 2 to 6 carbon atoms, inclusive, are ethylene glycol, propylene glycol, 1,4-butanediol, 1,5-pentanediol, 1,6-hexanediol, 1,2-hexanediol and the like.

Illustrative of N,N'-di(hydroxyalkyl)anilines are the polyol adducts produced by mixing from 2 to 20 molar equivalents of ethylene oxide, propylene oxide or 1,2-butylene oxide with one molar equivalent of aniline in accordance with methods conventionally employed in the art. Hydroxyalkylation of aniline with two molar equivalents of an alkylene oxide proceeds satisfactorily in the absence of a catalyst. However, when more than two molar equivalents of alkylene oxide per molar equivalent of aniline are used, it is desirable to employ a hydroxyalkylation catalyst such as sodium hydroxide, potassium hydroxide and like alkali metal hydroxides.

In said compositions having a curative incorporated therein, the overall ratio of isocyanate to active hydrogen atoms is still within the previously defined limits of 0.95:1 to 1.2:1 and preferably 1.03:1 to 1.08:1. Said ratio of isocyanate to active hydrogen atoms accordingly controls the proportion of isocyanate component $a$ to total active hydrogen containing materials in components $b$, $c$, and $d$. The proportion of the blowing agent component $c$ in the mixture is governed by the same considerations set forth above in relation to those compositions of the invention which comprise a combination of components $a$, $b$, and $c$ without the use of component $d$.

The relative proportions of components $b$ and $d$ can vary over wide limits. Advantageously, the number of equivalents of components $d$ employed in preparing the compositions of the invention is at least equal to the number of equivalents of component $b$. Preferably the proportion of component $d$ is from about 1 equivalent to about 5 equivalents per equivalent of component $b$.

The methods of formulating the compositions of the invention which include a curative are the same as those described above for the compositions of the invention, in general, the only difference being the inclusion of the curative. When using a prepolymer method the curative is generally introduced at the second stage of the reaction, i.e. is reacted, in the presence of blowing agent and catalyst, with the isocyanate-terminated prepolymer obtained by reaction of the isocyanate component $a$ and polyol component $b$. When using a one-shot technique the curative $d$ is merely added to the reaction mix either as a separate stream or after preliminary mixing with one or more of the other components of the reaction mix with which it is compatible.

When making any of the compositions of the invention, with or without a curative, optional additives such as dispersing agents, cell stabilizers, surfactants, flame retardants, antioxidants, colorants, fillers, and the like can be employed if desired. Thus, a finer cell structure can frequently be obtained if water-soluble organosilicone polymers are incorporated as surfactants. Organosilicone polymers obtained by condensing a polyalkoxy polysilane with the monoether of a polyalkylene ether glycol in the presence of an acid catalyst are representative of those surfactants which can be used for this purpose. The organosilicone polymer available under the trade name L-5320 is typical of such polymers. Other surfactants such as ethylene oxide modified sorbitan monopalmitate or ethylene oxide modified polypropylene ether glycol may be used, if desired, to obtain good cell structure and uniformity of the cellular elastomer.

The aforesaid optional additives also include pigments such as those conventionally used in coloring polyurethanes, and lubricants such as molybdenum sulfide and the like where the elestomer is to be used as a mechanical seal, or in any application in which the elastomer is to be introduced into a metal housing, said lubricant serving to facilitate introduction of the elastomer into the housing.

The high density cellular polyurethane elastomers prepared in accordance with the invention are characterized by high flex life i.e. they show minimum cut growth after 1500 cycles when tested at —20° F. in the Ross Flex Tester (ASTM–D–1052–55); by high resistance to permanent deformation; by high abrasion when subjected to 1000 cycles on the Taber Abrader, using a H–22 wheel and a 1000 g. weight, by high tear strength i.e. having a value of at least 50 p.l.i. when tested in accordance with ASTM–D–624–54; and by high resistance to deformation under actual use conditions. In addition, those compositions of the invention which have incorporated therein a curative as hereinbefore defined, in the proportions hereinbefore defined, are also characterized by a Shore A hardness (ASTM–D–676–59T) of at least about 20.

The above physical properties of the high density cellular polyurethanes of the invention make said foams useful in a variety of applications enumerated above. In particular, those compositions of the invention which have incorporated therein a curative as hereinbefore defined are especially useful in the preparation of shoe soles and heels. For this purpose, the compositions of the invention can be cast or molded in appropriately shaped molds to prepare a shoe sole and heel blank. The latter can subsequently be cut, if necessary, to the appropriate size and shape before being attached to a shoe upper by stitching or by use of appropriate adhesives in accordance with procedures well-known in the shoe manufacturing art. Alternatively, the compositions of the invention can be employed in the fabrication of shoe soles by pouring the appropriate reaction mix directly into a mold which has the shoe upper so positioned therein that the shoe sole is formed and bonded directly to the shoe upper.

When molding shoe soles and heels, or indeed any of the many articles which can be molded using the compositions of the invention, the required density in the finished product is achieved partly by using the appropriate amount of blowing agent as previously discussed and, if desired, partly by using the technique known as "packing" the mold. Using the latter procedure the mold is generally closed by means of a plate or baffle which is vented to allow gases to esape from the mold but which prevents the seepage of foam mix from the mold. In general, the amount of foam-mix placed in such a mold is from about 5 to 10% greater than that which would fill the mold with finished foam under free rise conditions. The density of the foam produced when "packing" is employed is accordingly greater than that produced by the same foam mix under free rise conditions; and, hence, appropriate allowance is made when calculating the proportions of reactants and blowing agent needed to produce a foam of any required density.

In addition to their use as shoe soles and heels, the compositions of the invention having a curative $d$ incorporated therein can be used for a variety of purposes which will be obvious to one skilled in the art. For example, the novel high density cellular polyurethane elastomers of the invention having a Shore A hardness of at least about 20 can be used in any of the applications enumerated above for the compositions of the invention which do not include a curative $d$.

The following examples describe the manner and process of making and using the invention and set forth the best mode contemplated by the inventors of carrying out the invention but are not to be construed as limiting.

EXAMPLE 1

A high density cellular polyurethane elastomer was prepared as follows:

A mixture of 15.1 parts by weight of 3,3'- dichlorobenzidine and 100 parts by weight of poly(diethylene glycol)adipate [F-18-62; hydroxyl number 111.9; molecular weight 1000; Witco Chemical Company] was blended by heating to 90° to 100° C. with stirring. The resulting blend was allowed to cool to below 40° C. before adding thereto, with stirring 2 parts by weight of a liquid silicone-glycol copolymer foam stabilizer and cell control additive (DC-113; Dow Corning), 0.4 part by weight of a 20% by weight solution of triethylene diamine in alkanolamine (DABCO R-8020; Houdry Process and Chemical Company), 0.09 part by weight of stannous octoate, 0.45 part by weight of water, and 1.5 parts by weight of colorant (Urethane Black Paste AU; Verona Dyestuff, Union, N.J.). The blend was then rapidly mixed, using a mechanical blender, with 56.9 parts by weight of modified methylenebis(phenyl isocyanate) [equivalent weight 143.3; prepared by heating methylenebis(phenyl isocyanate) containing 94% 4,4'-isomer and 6% 2,4'-isomer with 3% by weight of triethylphosphate at 220° C. for 3 hours before cooling to approximately 70° C.] and 240 parts by weight of the resulting mix was poured rapidly into a two piece die-matched aluminum-filled epoxy mold for a one piece shoe sole and heel (10½ man's shoe). The inner surfaces of the mold had been coated previously with a urethane mold release agent (Permamold 119-17L; Britain and Co., Westwood, N.J.). The mold was completely closed (apart from vent holes at the tip of the toe and heel portions). The resulting cellular elastomer shoe sole was cured, after removing from the mold, for 24 hours at approximately 20 to 25° C. and was then found to have the following properties.

Density:
    Heel overall, p.c.f.—19.2
    Heel core, p.c.f.—17.0
    Toe overall, p.c.f.—22.5
    Toe core, p.c.f.—21.0
Water absorption, percent by wt.—2.67
Open cells, percent—13.2
Die "C" tear: p.l.i. (ASTM-D-624-54)—88
Tensile strength, p.s.i. (ASTM-D-412-62T)—477
Elongation, percent (ASTM-D-412-62T)—250
Load bearing, p.s.i. (ASTM-D-1056-62T):
    at 10% deflection—19.2
    at 25% deflection—28.8
    at 50% deflection—72.1
Hardness, Shore A (ASTM-D-676-59T):
    max.—60
    5 seconds—55
Ross flex test (ASTM-D-1052-55) room temperature—
    No cut growth after 100,000 cycles
Taber abrasion test, weight loss—30-35 mg.

EXAMPLE 2

Three high density cellular polyurethane elastomer shoe soles were prepared using the ingredients and proportions (all parts by weight) listed in Table I below. The operating procedure, including molding, was that described in Example 1, all ingredients other than the isocyanate being preblended prior to admixture with the isocyanate. The mold employed was the same as that described in Example 1. After curing for 24 hours at approximately 20° C. various physical properties of the resulting shoe soles were determined. The data so obtained is set forth in Table I below.

TABLE I

|  | Elastomer | | |
| --- | --- | --- | --- |
|  | A | B | C |
| Materials: | | | |
| Poly (ethyleneadipate) diol,[1] mol. wt. 3,000 | 152.5 | 152.5 | 152.5 |
| Ethylene glycol | 15.5 | 15.5 | 15.5 |
| Water | 0.75 | 0.75 | 0.75 |
| Organosilicone surfactant [2] | 3.00 | 3.00 | 3.00 |
| 33% triethylenediamine in dipropylene glycol [3] | 0.7 | 0.7 | 0.7 |
| Colorant [4] | 2.0 | 2.0 | 2.0 |
| Modified methylenebis (phenyl isocyanate) [5] | 93.5 | 98.3 | 108 |
| NCO/OH ratio | 0.95/1.0 | 1.01/1.0 | 1.10/1.0 |
| Properties: [6] | | | |
| Water absorption percent | 31.5 | 31.3 | 32.0 |
| Open cells, percent | 14.6 | 22.6 | 35.8 |
| Density: | | | |
| Heel core, p.c.f. | 25.30 | 23.4 | 24.5 |
| Heel overall, p.c.f. | 27.4 | 26.4 | 25.2 |
| Toe core, p.c.f. | 20.3 | 23.5 | 22.4 |
| Toe overall, p.c.f. | 27.0 | 29.2 | 28.0 |
| Hardness, Shore A: | | | |
| Max | 62 | 61 | 65 |
| 5 sec | 55 | 52 | 56 |
| Die C tear, p.l.i | 149.0 | 128.0 | 156.0 |
| Tensile, p.s.i | 711 | 803 | 750 |
| Elongation, percent | 325 | 350 | 250 |
| Taber abrasion: loss, mg. | 59 | 43 | 35 |
| Ross flex test at −20° F.: | | | |
| Percent cut growth after 2,000 cycles | 150 | 400 | 650 |
| No. of cycles for complete failure | 9,100 | 4,400 | 2,600 |
| Load bearing, p.s.i. at— | | | |
| 10% deflection | 15.3 | 27.3 | 24.5 |
| 25% deflection | 46.0 | 51.5 | 57.0 |
| 50% deflection | 84.0 | 121 | 141 |

[1] Polyester diol S-101-35 from Rubber Corporation, Division of Hooker Chem. Co.
[2] Union Carbide Corporation.
[3] DABCO 33LV: Houdry Process and Chemical Company.
[4] Urethane Black Paste AU: Verona Dyestuff, Union, N.J.
[5] Prepared as described in Example 1.
[6] All properties determined using the test procedures specified in Example 1.

EXAMPLE 3

Three high density cellular polyurethane elastomer shoe soles were prepared using the ingredients and proportions (all parts by weight) listed in Table II below. The operating procedure, including molding, was that described in Example I, all ingredients other than the isocyanate being preblended prior to admixture with isocyanate. The mold employed was the same as that described in Example 1. After curing for 24 hours at approximately 20° C. various physical properties of the resulting shoe soles were determined. The data so obtained is set forth in Table II below.

TABLE II

| | Elastomer | | |
|---|---|---|---|
| | D | E | F |
| Materials: | | | |
| Polycaprolactone diol [1] (molecular weight 2,000) | 101.8 | 101.8 | 101.8 |
| 3,3'-dichlorobenzidine | 16.4 | 16.4 | 16.4 |
| Water | 0.45 | 0.45 | 0.45 |
| Organosilicone surfactant [2] | 2.0 | 2.0 | 2.0 |
| Stannous octoate | 0.08 | 0.08 | 0.08 |
| 20% triethylenediamine in alkanolamine [3] | 0.6 | 0.6 | 0.6 |
| Colorant [4] | 2.0 | 2.0 | 2.0 |
| Modified methylene bis(phenyl isocyanate) [5] | 39.6 | 41 | 42.3 |
| NCO/active hydrogen | 0.98/1.0 | 1.015/1.0 | 1.05/1.0 |
| Properties: [6] | | | |
| Water absorption, percent | 2.9 | 1.9 | 2.1 |
| Open cells, percent | 13.82 | 6.71 | 9.14 |
| Density: | | | |
| Heel core, p.c.f | 26.78 | 26.01 | 25.3 |
| Heel overall, p.c.f | 29.3 | 27.2 | 27.0 |
| Toe core, p.c.f | 25.19 | 21.50 | 25.25 |
| Toe overall, p.c.f | 28.66 | 26.49 | 28.78 |
| Hardness, Shore A: | | | |
| Max | 57 | 55 | 65 |
| 5 sec | 50 | 48 | 57 |
| Die "C" tear, p.l.i | 101.7 | 112.0 | 97.2 |
| Tensile, p.s.i | 416.3 | 504.9 | 723.6 |
| Elongation, percent | 325 | 350 | 350 |
| Taber abrasion: wt. loss, mg | 60 | 27 | 13 |
| Ross flex test at −20° F.: | | | |
| Percent cut growth after 2,000 cycles | 0 | 100 | 100 |
| No. of cycles for complete failure | 22,000 | 13,400 | 13,200 |
| Load bearing, p.s.i.: | | | |
| 10% deflection | 35.16 | 27.13 | 41.0 |
| 25% deflection | 53.91 | 65.89 | 70.9 |
| 50% deflection | 97.66 | 112.40 | 123.1 |

[1] Niax D-560: Union Carbide Corporation.
[2] L-5320: Union Carbide Corporation.
[3] R-8020 (see Example 1).
[4] Urethane Black Paste AU (see Example 1).
[5] Prepared as described in Example 1.
[6] All properties determined using the test procedures specified in Example 1.

EXAMPLE 4

A series of high density cellular polyurethane elastomer shoe soles was prepared using the ingredients and proportions (all parts by weight) listed in Table III below. The operating procedure, including molding, was that described in Example 1, all ingredients other than the isocyanate being preblended prior to admixture with the isocyanate. The mold employed was the same as that described in Example 1. After curing for 24 hours at approximately 20° C. various physical properties of the resulting shoe soles were determined. The data so obtained is set forth in Table III below.

TABLE III

| | Elastomer | | |
|---|---|---|---|
| Materials | G | H | I |
| Polyether triol [1]; eq. wt. ca. 1,500 | 151.1 | 153 | 150.8 |
| Polytetramethylene glycol,[2] eq. wt. 404 | | | 40.4 |
| Ethylene glycol | 15.5 | | |
| 3,3'-dichlorobenzidine | | 25.2 | 25.2 |
| Water | 0.45 | 0.6 | 0.7 |
| Organosilicone surfactant | [3] 3.0 | [3] 3.0 | [4] 3.0 |
| Stannous octoate | | 0.12 | 0.2 |
| 20% triethylenediamine in alkanolamine [5] | | | 0.6 | 1.4 |
| 33% triethylenediamine in dipropylene glycol [6] | 0.1 | | |
| Dibutyltindilaurate | 0.1 | | |
| Colorant [7] | 3.0 | 2.0 | 2.0 |
| Modified methylenebis-(phenyl isocyanate) [8] | 98.0 | 54.5 | 72.0 |
| NCO/active H | 1.05/1.0 | 1.05/1.0 | 1.05/1.0 |
| Overall density, p.c.f | 32.7 | 29.8 | 26.9 |
| Hardness, Shore A: | | | |
| Max | 63 | 57 | 47 |
| 5 sec | 57 | 51 | 37 |
| Die "C" tear, p.l.i | 66.5 | 77.0 | 5 |
| Tensile, p.s.i | 315.0 | 271.4 | 202 |
| Elongation, percent | 125 | 150 | 250 |
| Ross flex test at −20° F.: | | | |
| Percent cut growth at 2,000 cycles | 375 | 400 | Nil |
| Percent cut growth at 10,000 cycles | | | 175 |
| No. of cycles for complete failure | 4,000 | 4,660 | |
| Taber abrasion: wt. loss, mg | 17 | 87 | |

[1] TPE-4542 Polyoxyalkylene derivative of trimethylolpropane: Wyandotte Chemical.
[2] Polymeg: Quaker Oats Corporation.
[3] DC-113 (see Example 1).
[4] L-5320 (see Example 3).
[5] R-8020 (see Example 1).
[6] DABCO 33LV (see Example 2).
[7] Urethane Black Paste AU (see Example 1).
[8] Prepared as described in Example 1.

NOTE.—All properties determined using the test procedures specified in Example 1.

EXAMPLE 5

A high density cellular polyurethane elastomer shoe sole was prepared using the ingredients and proportions (all parts by weight) listed in Table IV below. The operating procedure, including molding, was that described in Example 1, all ingredients other than the isocyanate being preblended prior to admixture with the isocyanate. The mold employed was the same as that described in Example 1. After curing for 24 hours at approximately 20° C. various physical properties of the resulting shoe sole were determined.

The data so obtained are set forth in Table IV below.

TABLE IV

| Materials: | |
|---|---|
| Polyether triol,[1] eq. wt. ca. 1500 | 151.1 |
| Polycaprolactone diol,[2] eq. wt. 430 | 43.0 |
| 3,3'-dichlorobenzidine | 28.4 |
| Water | 0.8 |
| Organosilicone surfactant | 4.0 |
| Stannous octoate | 0.2 |
| 20% triethylenediamine in alkanolamine [3] | 1.4 |
| Colorant | 3.0 |
| Modified methylenebis (phenyl isocyanate) [4] | 77.3 |
| NCO/active H ratio | 1.05/1.0 |
| Properties: [5] | |
| Overall density, p.c.f. | 29.1 |
| Hardness Shore A: | |
| Max. | 60 |
| 5 sec. | 50 |
| Die "C" tear, p.l.i. | 79.4 |
| Tensile, p.s.i. | 285.0 |
| Elongation, percent | 215 |
| Taber abrasion: wt. loss (mg.) | 21 |
| Ross flex at −20° F., number of cycles for complete failure | 1870 |

[1] TPE 4542 (see Example 4).
[2] D-520: Union Carbide Corporation.
[3] R-8020 (see Example 1).
[4] Prepared as described in Example 1.
[5] All properties determined using the test procedures specified in Example 1.

Using any of the procedures specified in Examples 1 through 5 but replacing the modified methylenebis(phenyl isocyanate) therein used by a mixture of polymethylene polyphenyl isocyanates containing approximately 70% by weight of methylenebis(phenyl isocyanate) and having an equivalent weight of 130 (Carwinate® 390P; The Upjohn Company, Polymer Chemicals Division), there are obtained corresponding shoe soles.

EXAMPLE 6

A high density cellular polyurethane elastomeric spring pad for automotive use was prepared as follows.

A mixture of 142.5 parts by weight of a 3000 molecular weight poly(diethylene glycol) adipate (S 1011–41; Rubber Corporation Division of Hooker Chemical Corporation), 15.5 parts by weight of ethylene glycol, 0.1 part by weight of water, 3 parts by weight of organosilicone surfactant (L-5320; Union Carbide), 0.4 part by weight of 33% triethylenediamine in dipropylene glycol (DABCO 33LV) and 3 parts by weight of colorant (Urethane Black Paste AU; see Example 1) was prepared using a mechanical blender. The resulting mixture was then mixed rapidly, using a mechanical blender, with 92 parts by weight of the modified methylenebis(phenyl isocyanate) [prepared as described in Example 1] and the mixture was poured rapidly into the appropriate spring pad mold. The mold was completely closed except for vent holes. The resulting elastomeric spring pad was cured, after removing from the mold, for 24 hrs. at approximately 20 to 25° C. and then found to have the following properties.

Density—25 p.c.f.
Shore A Hardness—50-55

EXAMPLE 7

Poured-in-place gaskets for the air filter case of an automobile internal combustion engine were prepared from three formulations using the quantities (in parts by weight) and ingredients set forth below. In each case the formulations were prepared by premixing all ingredients except the polyisocyanate and then mixing the blend with the polyisocyanate using a mixing and dispensing head, the resulting mixture being dispensed directly as an approximately ½" wide band around the grooved edge (previously cleaned by wire brush) of an air filter case. The poured mixture was allowed to rise freely and, after curing for 24 hrs. at approximately 20 to 25° C., was found to have the properties shown in the following Table V.

TABLE V

| | J | K | L |
|---|---|---|---|
| Materials: | | | |
| Polyether triol¹; eq. wt. 1,500 | 154.5 | 154.5 | 154.5 |
| Ethylene glycol | 3.1 | 9.3 | 9.3 |
| Water | 0.6 | 0.7 | 0.7 |
| Organosilicone surfactant² | | 3.0 | 3.0 |
| Dibutyltindilaurate³ | 0.1 | 0.07 | 0.07 |
| Triethlyenediamine⁴ | 0.1 | 0.07 | 0.07 |
| Colorant⁵ | 0.5 | | |
| Plasticizer⁶ | | 8.4 | 18.5 |
| Carbon black | | 0.8 | 0.8 |
| Modified methylenebis-(phenyl isocyanate) | 40 | 72 | 72 |
| Properties: | | | |
| Density, p.c.f | 11 | 11 | 11 |
| Shore 00 hardness | 50 | 65-70 | 60-65 |

¹ TPE-4542; see Example 4.
² L-5320; see Example 3.
³ D-22; Union Carbide.
⁴ DABCO-33LV; see Example 2.
⁵ Urethane Black Paste AU; see Example 1.
⁶ Mobilsol-66; Mobil Oil Company.

EXAMPLE 8

Three poured-in-place gaskets for the air filter case of an automobile internal combustion engine were prepared using the ingredients and quantities (parts by weight) set forth below and the procedures described in Example 7.

TABLE VI

| | |
|---|---|
| Poly(diethylene glycol) adipate¹ | 98.8 |
| Water | 0.7 |
| Triethylenediamine² | 0.8 |
| N-methylmorpholine | 2.5 |
| Organosilicone cell opener³ | 0.5 |
| Carbon paste⁴ | 1.0 |
| Polymethylene polyphenyl isocyanate⁵ | 38.7 |

¹ F18-62; see Example 1.
² DABCO 33LV; see Example 2.
³ Y-4499: Union Carbide.
⁴ 25% by weight of carbon black in F18-62 suspension.
⁵ Equivalent weight 133: PAPI®, The Upjohn Company.

After curing for 24 hrs. at approximately 20 to 25° C. the assembled air filter case covers and housing with the gaskets in place were exposed to a temperature of 100° C. for 3 hours. The assemblies were allowed to cool to approximately 20° C. before being disassembled. In each the gasket recovered its original shape completely within 30 seconds of disassembly. Other properties of the gaskets were: skin hardness 52-58 Shore 00; increase in thickness after immersion in gasoline for 20 hours, 2.9%.

EXAMPLE 9

Employing the procedure of Example 1, a series of high density cellular polyurethane elastomer test pieces measuring 7" x 7" x ¼" was prepared using the ingredients and proportions (all parts by weight) set forth in Table VI. The mold was an aluminum mold having a cavity measuring 7" x 7" x ¼". Physical properties of the microcellular elastomers were determined, after removal from the mold and curing 72 hours at room temperature (20°-30° C.), using the test procedures of Example 1.

TABLE VII

| Foams | M | N |
|---|---|---|
| Materials: | | |
| Poly B-D R-45M¹ | 130 | 117.5 |
| N,N'-di(2-hydroxypropyl)aniline | 10.3 | 20.8 |
| Raven 30 carbon black² | 3.2 | |
| Urethane Black Paste AU | | 2.0 |
| Water | 0.8 | 0.3 |
| L-5320 | 2.0 | 2.0 |
| Dibutyl tin dilaurate | 0.2 | 0.2 |
| Dabco 33LV | 0.4 | 0.5 |
| Polyisocyanate of Example 1 | 43.2 | 50.3 |
| NCO/active hydrogen ratio | 1.05/1.00 | 1.05/1.00 |
| Physical properties: | | |
| Density, p.c.f | 25.3 | 28.0 |
| Hardness, Shore A | 54 | 58 |
| Tensile strength, p.s.i | | 377 |
| Elongation, percent | | 155 |
| Die "C" tear, p.l.i | 47.6 | 75 |
| Taber abrasion, loss (mg.) | 127 | 162 |
| Ross flex test at —20° F.: | | |
| No. cycles for 100% cut growth | 31,900 | 23,618 |
| No. cycles for 300% cut growth | 101,600 | 91,943 |

¹ Hydroxy-terminated polybutadiene resin having a hydroxyl equivalent weight of 1,250 and a functionality of slightly greater than two, see Sinclair Petrochemicals, Inc. Product Data Bulletin 505, "Poly B-D Liquid Resins," revised January 1966.
² See Columbian Carbon Company Technical Service Report No. 200, April 1967.

EXAMPLE 10

A series of high density cellular polyurethane elastomer test pieces measuring 7" x 7" x ¼" was prepared in accordance with the procedure of Example 1 employing the reactants and proportions (all parts by weight) set forth in Table VIII. Physical properties of the resultant cellular elastomers were determined, after curing 72 hours at room temperature, using the test procedures of Example 1.

TABLE VIII

| | O | P | Q |
|---|---|---|---|
| Materials: | | | |
| Poly B-D R-45M | 117.5 | 117.5 | 117.5 |
| N,N'-di(2-hydroxypropyl) aniline (hydroxy eq. wt. 106) | 20.8 | 20.8 | 20.8 |
| Water | 0.3 | 0.1 | 0.1 |
| L-5320 | 2.0 | 2.0 | 2.0 |
| Dibutyl tin dilaurate | 0.2 | 0.2 | 0.2 |
| Dabco 33LV | 0.5 | 0.5 | 0.5 |
| Urethane Black Paste AU | 2.0 | 2.0 | 2.0 |
| Polyisocyanate of Example 1 | 50.3 | | |
| Polyisocyanate mixture¹ | | 42.2 | |
| 4,4'-methylenebis(phenyl isocyanate) | | | 41.0 |
| NCO/active hydrogen ratio | 1.05/1.00 | 1.05/1.00 | 1.05/1.00 |
| Physical properties: | | | |
| Density, p.c.f | 28.4 | 29.4 | 30.7 |
| Hardness: | | | |
| Shore A | 62 | 63 | 59 |
| After 5 seconds rest | 58 | 58 | 54 |
| Die "C" tear, p.l.i | 75 | 109.7 | 106 |
| Tensile strength, p.s.i | 377 | 408.2 | 399.6 |
| Elongation, percent | 155 | 226 | 273 |
| Ross flex at —20° F.: | | | |
| No. cycles for 350% cut growth | 91,943 | | |
| No. cycles for 400% cut growth | | 185,350 | |
| No. cycles for complete failure | | | 209,618 |

¹ A mixture of 4 equivalents of 4,4'-methylenebis (phenyl isocyanate) and 1 equivalent of the polyisocyanate equivalent of the polyiscyanate of Example 1. The mixture has an average isocyanote equivalent of 130.

EXAMPLE 11

A high density cellular polyurethane elastomer test specimen measuring 7" x 7" x ¼" was prepared using the procedure of Example 1 by blending 96.2 parts (0.064 equivalent) of polyester diol S–101–35 (see Example 1); 5.8 parts (0.187 equivalent) of ethylene glycol, 31.2 parts (0.0234 equivalent) of Poly B–D R–15M, a hydroxy-terminated polybutadiene resin having a hydroxyl equivalent weight of 1330 and a functionality slightly greater than two, (see, Sinclair Petrochemicals, Inc. Product Bulletin No. 505, "Poly B–D Liquid Resins," revised January 1966), 0.45 part (0.05 equivalent) of water, 2.0 parts of L–5320, 0.6 part of Dabco 33LV and 2.0 parts of Urethane Black Paste–AU. To this mixture was added, with mixing, 47.7 parts (0.333 equivalent) of the polyisocyanate of Example 1 and poured into the mold. Physical properties of the resultant cellular elastomer were determined, after aging 72 hours at room temperature, employing the test procedures of Example 1.

TABLE X

Foam physical properties:
| | |
|---|---|
| Density, p.c.f. | 31.5 |
| Hardness, Shore A | 43 |
| Die "C" tear, p.l.i. | 101 |
| Tensile strength, p.s.i. | 727 |
| Elongation, percent | 410 |
| Ross Flex at −20° F., number cycles for complete failure | 3,000 |

EXAMPLE 12

High density polyurethane cellular elastomeric shoe soles were prepared in accordance with the invention employing a metering and dispensing modulating unit equipped with Zenith gear-type pumps (Zenith Products Co., West Newton, Mass.) and a standard 420–S Star Foundry and Machine Co. mixing head (New Lexington, Ohio).

The foam ingredients and proportions set forth in Table XII were dispensed at about 2.0 pounds per minute. The components were metered and mixed as two separate streams. One stream (component A) comprised the polyisocyanate of Example 1 and the second stream (component B) was made up of a preformed mixture of the polyol, curative, dye, surfactant, catalyst, and blowing agent. The physical properties of the resultant shoe soles were determined, after curing at room temperature, using the test procedures of Example 1.

TABLE XII

| | R |
|---|---|
| Component A—Polyisocyanate of Example 1 | 33.2 |
| Component B: | |
| Poly B–D R–45M | 86.1 |
| N,N'-di(2 - hydroxypropyl)aniline (hydroxyl eq. wt. 106) | 11.9 |
| Raven–30 carbon black | 2.0 |
| L–5320 | 2.0 |
| Dibutyl tin dilaurate | 0.08 |
| Dabco 33LV | 0.25 |
| Water | 0.45 |
| Physical properties: | |
| Density, p.c.f. | 25.1 |
| Tensile, p.s.i. | 380 |
| Elongation, percent | 203 |
| Taber abrasion, loss (mg.) | 330 |
| Die "C" tear, p.l.i. | 68.3 |
| Hardness, Shore A | 57 |
| Load bearing, p.s.i.: | |
| At 10% deflection | 32.1 |
| At 25% deflection | 58.9 |
| At 50% deflection | 108.6 |
| Ross flex test at −20° F. number of cycles for complete failure | 137,000 |

EXAMPLE 13

Following the procedure of Example 12 high density polyurethane cellular shoe soles were prepared employing the ingredients and proportions set forth in Table XIII. Physical properties of the resultant shoe soles were determined, after curing at least 48 hours at room temperature, using the test procedures of Example 1.

TABLE XIII

| Materials: | S |
|---|---|
| TPE–4542 | 69.4 |
| C–126 | 11.6 |
| Polytetramethylene glycol—1000 [1] | 19.0 |
| L–5320 | 2.0 |
| Stannous octoate | 0.45 |
| R–8020 | 0.6 |
| Raven–30 carbon black | 2.0 |
| Water | 0.3 |
| Polyisocyanate mixture of Example 10 | 27.1 |
| NCO/Active hydrogen ratio | 1.02/1.00 |
| Physical Properties: | |
| Density, p.c.f. | 33.2 |
| Tensile strength, p.s.i. | 416 |
| Elongation, percent | 420 |
| Taber abrasion, loss (mg.) | 545 |
| Die "C" tear, p.l.i. | 83.0 |
| Hardness, Shore A | 40 |
| Ross flex at −20° F.: | |
| Number cycles for 100% cut growth | 9,000–18,000 |
| Number cycles for 800% cut growth | 24,000–53,000 |

[1] Polymeg 1000-Quaker Oats Corporation.

EXAMPLE 14

A series of high density cellular polyurethane elastomeric test specimens 7" x 7" x ¼" was prepared following the method of preparation of Example 1 employing the reactants and proportions (all parts by weight) set forth in Table XIV. Physical properties of the resultant cellular elastomers were determined, after curing 72 hours at room temperature, using the test procedure of Example 1.

TABLE XIV

| | T | U | V |
|---|---|---|---|
| Materials: | | | |
| Poly B–D R–45M | 117.5 | 117.5 | 117.5 |
| N,N'-di(2-hydroxypropyl) aniline (hydroxyl eq. wt. 106) | 20.8 | 20.8 | 20.8 |
| L–5320 | 2.0 | 2.0 | 2.0 |
| Dibutyl tin dilaurate | 0.2 | 0.3 | 0.3 |
| Dabco 33LV | 0.5 | 0.6 | 0.6 |
| Urethane Black Paste AU | 2.0 | 2.0 | 2.0 |
| Methylene chloride | 7.0 | 6.0 | 6.0 |
| 4,4'-methylenebis(phenyl isocyanate) | 39.6 | | |
| Polyisocyanate mixture of Example 10 | | 40.7 | |
| Polyisocyanate of Example 1 | | | 45.7 |
| NCO/active hydrogen ratio | 1.05/1.00 | 1.05/1.00 | 1.05/1.00 |
| Physical properties: | | | |
| Density, p.c.f. | 30.5 | 34.8 | 34.1 |
| Hardness, Shore A | 57 | 65 | 63 |
| Die "C" tear, p.l.i. | 145.6 | 124 | 83.2 |
| Tensile strength, p.s.i. | 526.8 | 466.7 | 407.2 |
| Elongation, percent | 240 | 205 | 156 |
| Ross flex at −20° F.: No. cycles for complete failure | [1] 202,580 | [1] 209,618 | [1] 202,580 |

[1] Samples did not fail, testing stopped.

We claim:

1. A cellular polyurethane elastomer having a density from about 20 to about 40 pounds per cubic foot which comprises the product of a one-shot reaction of (a) a polyisocyanate selected from the class consisting of (i) methylenebis(phenyl isocyanate) and (ii) methylenebis(phenyl isocyanate) which has previously been heated at 160° C. to 250° C. in the presence of about 0.1 percent to about 3 percent of a trialkyl phosphate until the isocyanate equivalent is within the range of 130 to 150;

(b) a polyol selected from the group consisting of polyester diols having an equivalent weight from about 75 to about 1700, polyether polyols having an equivalent weight from about 300 to about 1600 and an average functionality from about 2.0 to about 4.0, and mixtures thereof;
(c) a member selected from the class consisting of (i) aromatic primary diamines wherein each of the amino groups is attached directly to an aromatic nucleus, and wherein there is at least one group selected from the class consisting of halogen, lower alkyl and lower alkoxy in a position ortho to the amino groups in the aromatic nucleus, and (ii) aliphatic hydrocarbon diols having from 2 to 6 carbon atoms, inclusive; and
(d) a blowing agent selected from the group consisting of water and aliphatic halogenated hydrocarbons having a boiling point not more than 110° C. and mixtures thereof;
wherein the ratio of isocyanate groups to active hydrogen atoms in said reaction components, including the water when the latter is employed as blowing agent, is within the range of about 0.95:1.0 to about 1.2:1.0, and wherein the ratio of proportion of equivalents of components (b) and (c) is within the range of about 1:1 to about 1:5.

2. The cellular polyurethane elastomer of claim 1 wherein the blowing agent is water.

3. A shoe sole fabricated from a cellular polyurethane elastomer as claimed in claim 1.

4. A cellular polyurethane elastomer having a density from about 20 to about 40 pounds per cubic foot which comprises the product of a one-shot reaction of
(a) methylenebis(phenyl isocyanate) which has previously been heated at about 160° C. to about 250° C. in the presence of about 0.1% to about 3% of a trialkyl-phosphate until the isocyanate equivalent is within the range of 130 to 150;
(b) a polyol selected from the group consisting of polyester diols having an equivalent weight from about 75 to about 1700, polyether polyols having an equivalent weight from about 300 to about 1600 and an average functionality from about 2.0 to 4.0 and mixtures thereof;
(c) a member selected from the class consisting of (i) aromatic primary diamines wherein each of the amino groups is attached directly to an aromatic nucleus and wherein there is at least one group selected from the class consisting of halogen, lower alkyl and lower alkoxy in a position ortho to the amino group in said aromatic nucleus, and (ii) aliphatic hydrocarbon diols having from 2 to 6 carbon atoms, inclusive; and
(d) water;
wherein the ratio of isocyanate groups to active hydrogen atoms in said reaction components, including the water, is within the range of about 0.95:1.0 to about 1.2:1.0, and wherein the ratio of proportion of equivalents of components (b) and (c) is within the range of about 1:1 to about 1:5.

5. The cellular polyurethane elastomer of claim 4 wherein component (c) is 3,3'-dichlorobenzidine.

6. The cellular polyurethane elastomer of claim 4 wherein the polyol component (b) is a polyester diol having an equivalent weight from about 800 to about 1700.

7. A shoe sole fabricated from a cellular polyurethane elastomer as claimed in claim 4.

8. A cellular polyurethane elastomer having a density from about 20 to about 40 pounds per cubic foot which comprises the product of a one-shot reaction of
(a) a polyisocyanate selected from the class consisting of (i) methylenebis(phenyl isocyanate) and (ii) methylenebis(phenyl isocyanate) which has previously been heated at 160° C. to 250° C. in the presence of about 0.1% to about 3% of a trialkyl phosphate until the isocyanate equivalent is within the range of 130 to 150;
(b) a polyalkadiene polyol having a hydroxyl equivalent weight of from about 300 to about 2000 and an average functionality of at least two; and
(c) a blowing agent selected from the group consisting of water, aliphatic halogenated hydrocarbons having a boiling point not more than 110° C. and mixtures thereof;
wherein the ratio of isocyanate groups to active hydrogen atoms in said reaction components, including the water when the latter is employed as blowing agent, is within the range of about 0.95:1.0 to about 1.2:1.0.

9. The cellular polyurethane elastomer of claim 8 wherein the blowing agent is water.

10. The cellular polyurethane elastomer of claim 8 wherein the polyalkadiene polyol has a hydroxyl equivalent weight of about 1000 to about 1500.

11. A shoe sole fabricated from a cellular polyurethane elastomer as claimed in claim 8.

12. A cellular polyurethane elastomer having a density from about 20 to about 40 pounds per cubic foot which comprises the product of a one-shot reaction of
(a) a polyisocyanate selected from the class consisting of (i) methylenebis(phenyl isocyanate) and (ii) methylenebis(phenyl isocyanate) which has previously been heated at 160° C. to 250° C. in the presence of about 0.1% to about 3% of a trialkyl phosphate until the isocyanate equivalent is within the range of 130 to 150;
(b) a polyalkadiene polyol having a hydroxyl equivalent weight of from about 1000 to about 1500 and an average functionality of at least two; and
(c) a N,N'-di(hydroxyalkyl)aniline having the formula:

$$\text{C}_6\text{H}_5-\text{N}\left[(\text{A}-\text{O})_n-\text{H}\right]_2$$

wherein $n$ has an average value of from 1 to 10 and A is a lower alkylene group of from 2 to 4 carbon atoms; and
(d) a blowing agent selected from the group consisting of water and aliphatic halogenated hydrocarbons having a boiling point not more than 110° C. and mixtures thereof;
wherein the ratio of isocyanate groups to active hydrogen atoms in said reaction components, including the water when the latter is employed as blowing agent, is within the range of about 0.95:1.0 to about 1.2:1.0, and wherein the ratio of proportion of equivalents of components (b) and (c) is within the range of about 1:1 to about 1:5.

13. The cellular polyurethane elastomer of claim 12 wherein the blowing agent is water.

14. A shoe sole fabricated from a cellular polyurethane elastomer as claimed in claim 12.

References Cited

UNITED STATES PATENTS

| 3,467,605 | 9/1969 | Abercrombie et al. | 260—2.5 |

FOREIGN PATENTS

| 593,741 | 3/1960 | Canada | 260—2.5 |
| 665,495 | 6/1963 | Canada. | |
| 1,438,004 | 3/1966 | France | 260—2.5 |

OTHER REFERENCES

Saunders et al.: Polyurethanes, Part II, pp. 177–178 (1964).

Bulletin of Sinclair Petrochemicals, Inc., Bulletin No. 505, issued May 1, 1965, pp. 17–25.

DONALD E. CZAJA, Primary Examiner

M. J. WELSH, Assistant Examiner

U.S. Cl. X.R.

36—25; 161—190; 260—2.5AP, 2.5AQ, 2.5AT